US008734882B2

(12) United States Patent
Ido et al.

(10) Patent No.: US 8,734,882 B2
(45) Date of Patent: May 27, 2014

(54) CARBONATED DRINK HAVING HIGH GAS PRESSURE

(75) Inventors: Yoshihiro Ido, Kawasaki (JP); Tetsuya Komine, Kawasaki (JP)

(73) Assignee: Suntory Beverage & Food Limited, Tokyo (JP)

( * ) Notice: Subject to any disclaimer, the term of this patent is extended or adjusted under 35 U.S.C. 154(b) by 103 days.

(21) Appl. No.: 13/121,085

(22) PCT Filed: Sep. 29, 2009

(86) PCT No.: PCT/JP2009/066933
§ 371 (c)(1),
(2), (4) Date: May 19, 2011

(87) PCT Pub. No.: WO2010/035869
PCT Pub. Date: Apr. 1, 2010

(65) Prior Publication Data
US 2011/0217431 A1   Sep. 8, 2011

(30) Foreign Application Priority Data

Sep. 29, 2008 (JP) ................................ 2008-250353

(51) Int. Cl.
*A23L 2/54* (2006.01)
(52) U.S. Cl.
USPC ........... 426/474; 426/477; 426/590; 426/654; 426/312
(58) Field of Classification Search
CPC ......... A23L 2/54; A23V 2250/11; A23B 4/16
USPC ........................ 426/590, 474, 477, 654, 312
See application file for complete search history.

(56) References Cited

U.S. PATENT DOCUMENTS

| 2,943,939 | A | * | 7/1960 | Karlson | 426/271 |
| 3,467,526 | A | * | 9/1969 | Mitchell et al. | 426/561 |
| 2006/0051483 | A1 | | 3/2006 | Watanabe et al. | |
| 2009/0196955 | A1 | | 8/2009 | Akinruli et al. | |

FOREIGN PATENT DOCUMENTS

| GB | 883169 A | 11/1961 |
| JP | 49-004372 | 1/1974 |
| JP | 55-013017 | 1/1980 |
| WO | 03/105610 | 12/2003 |
| WO | WO-2007078293 A1 | 7/2007 |

OTHER PUBLICATIONS

International Search Report mailed Oct. 27, 2009 in PCT/JP2009/066933 filed Sep. 29, 2009.
McCormick D.R. et al., "Polyfunctional phosphates—Ingredients essential to processed foods", Processed Prepared Foods, vol. 152, No. 2, 1983, pp. 97-98, 101.
Supplemental European Search Report issued Jul. 25, 2013, in EP 09 81 6281.

* cited by examiner

*Primary Examiner* — Helen F Heggestad
(74) *Attorney, Agent, or Firm* — Drinker Biddle & Reath LLP

(57) ABSTRACT

Provided is a carbonated drink having a high gas pressure which has improved bubble qualities and enhanced drinkability, is packaged in a container having a resealable cap, maintains a refreshing sensation, a light flavor and a pleasant cooling sensation expected in a carbonated drink having a high gas pressure even when opened and recapped and stored. The carbonated drink is a container-packaged carbonated drink, contains a condensed phosphate(s) in a concentration of 50 ppm or more and less than 2000 ppm, and has a gas pressure of 2.0 to 5.0 kg/cm$^2$.

7 Claims, No Drawings

CARBONATED DRINK HAVING HIGH GAS PRESSURE

CROSS REFERENCE TO RELATED APPLICATIONS

This application is the National Stage of International Application No. PCT/JP2009/066933, filed Sep. 29, 2009, and claims benefit of Japanese Application No. 2008-250353, filed Sep. 29, 2008, of which are herein incorporated by reference in their entirety.

TECHNICAL FIELD

The present invention relates to a carbonated drink having a high gas pressure of 2.0 to 5.0 kg/cm$^2$ inside a container.

BACKGROUND ART

The properties of foam and bubbles in carbonated drinks are one of the major factors that determine the taste of carbonated drinks. For this reason, various methods have been proposed to create a fine foam when drinking, to make the foam created last longer, and further to enhance the texture and taste. Examples thereof include a method in which a fine foam is caused to form by adding saponin, a foaming agent, thereby improving the foam retention (Patent Literature 1), and methods in which a fine foam is caused to form and/or the foam retention is improved by adding a protein, a degraded protein product, an emulsifier, a degraded starch product, a tea extract, or the like (Patent Literatures 2 to 6).

On the other hand, various phosphates have been used in carbonated drinks and non-carbonated drinks to serve as acidifier, chelating agent, anti-fade agent, antibacterial agent, and the like. For example, Patent Literature 7 discloses a non-carbonated diluted juice drink product which contains (i) a specific preservative, (ii) specific polyphosphate (sodium hexametaphosphates, and the like), (iii) added water having a hardness of 0 to 60 ppm, and which has a pH value of 2.5 to 4.5 as a final product and can be stored at environmental temperature for at least 10 days without substantial bacterial growth; Patent Literature 8 discloses a non-carbonated diluted juice drink product which contains (i) a specific antiseptics, (ii) a specific sodium polyphosphate, (iii) added water having a hardness of 61 to 220 ppm, and which has a pH value of 2.5 to 4.5 as a final product and can be stored at environmental temperature for at least 28 days without substantial bacterial growth. Further, Patent Literature 9 describes a carbonated drink with a green tea powder which contains the green tea powder, an antioxidant and 0.2 g/100 g (=2000 ppm) of a polymeric phosphate with carbon dioxide gas injected therein, is free of color fading or changing over an extended period of time, and maintains the green tea taste and flavor; Patent Literature 10 describes an orange juice having a low gas pressure containing 0.6 g/2.3 L (≈260 ppm) of polyphosphate and 350 mL of carbonated water. Furthermore, the above Patent Literature 5 discloses that the polymeric phosphate added to the carbonated drink is capable of achieving the improvement of taste, i.e., imparting mildness, but fails to exhibit the effective in creating a fine foam or improving the foam retention.

Still furthermore, Patent Literature 11 describes an additive for carbonated drinks which comprises spilanthol or a spilanthol-containing plant extract or plant essential oil used to solve the problems of the reduced carbonate sensation (stimulation, cooling sensation, etc.) caused by rapid evaporation of carbon dioxide gas after opening and of thus quickly lost function and palatability demanded for a beverage after opening.

CITATION LIST

Patent Document

Patent Document 1: Japanese Patent Laid-Open No. 61-92554
Patent Document 2: Japanese Patent Publication No. 45-100
Patent Document 3: Japanese Patent Laid-Open No. 60-1874372
Patent Document 4: Japanese Patent Laid-Open No. 4-356160
Patent Document 5: Japanese Patent Laid-Open No. 2002-330735
Patent Document 6: International Publication No. WO03/105610
Patent Document 7: National Publication of International Patent Application No. 9-509327
Patent Document 8: National Publication of International Patent Application No. 11-500916
Patent Document 9: Japanese Patent Laid-Open No. 57-194749
Patent Document 10: Japanese Patent Laid-Open No. 55-13017
Patent Document 11: Japanese Patent Laid-Open No. 2006-166870

SUMMARY OF INVENTION

Technical Problem

The moderate bubbles in a carbonated drink provides the sensations in the mouth and throat (mouthfeel and sensation when swallowing) which bring about a refreshing sensation while drinking and after drinking and create a light flavor and a pleasant cooling sensation. However, the methods for improving the foam properties described above all target the foam represented by those formed on the liquid surface when beer is poured into a glass but not for improving properties of bubbles generated in a liquid.

Further, a so-called carbonated drink having a high gas pressure to which carbon dioxide gas is injected to give a gas pressure range of 2.0 to 5.0 kg/cm$^2$ inside a container for the purpose of imparting more refreshing stimulating sensations can give a cooling feel by bubbles but poses the problem of the generated bubbles being coarse and unpleasant, whereby the refreshing stimulating sensations expected in a carbonated drink having a high gas pressure are not sufficiently satisfied.

Furthermore, recently, due to the convenience and the larger volume that has become common, the market of containers having a resealable cap such as a PET bottle and a bottle can (simply also referred to as a resealable container) has been expanded. In a carbonated drink packaged in a resealable container, a content liquid (carbonated drink) cannot be finished right after opening and may be consumed again several hours to several days after recapping. However, the literatures mentioned above for improving properties of the bubbles suggest nothing about the problem of maintaining the drinkability attained immediately after opening in the case where a once-opened carbonated drink is consumed after some time, more specifically, even when a gas pressure is reduced. When the methods described in these Literatures are applied to a resealable container, there are problems such as failing to maintain favorable bubbles, making the taste and texture originated from additives (saponin, protein, emulsifier, starches, etc.) non-neglectable at a reduced gas pressure, thereby remarkably deteriorating the drinkability as a drink.

An object of the present invention is to provide a carbonated drink having a high gas pressure with improved qualities of bubbles, and also to provide a carbonated drink having a high gas pressure with enhanced drinkability which is packaged in a container having a resealable cap and capable of maintaining, even when recapped and stored after opening, the refreshing stimulating sensations, light flavor and pleasant cooling sensation of carbonated drinks having a high gas pressure.

Solution to Problem

The present inventors extended studies to solve the problems described above and found that condensed phosphates, which have been thought useless in improving the properties of bubbles, can surprisingly change the properties of bubbles in carbonated drinks having a high gas pressure. More specifically, the present inventors found that in the carbonated drink having a high gas pressure to which a specific amount of a condensed phosphate is added, bubbles formed by a high gas pressure are synergistically fine and maintained. In addition, the present inventors further unexpectedly found that when this carbonated drink having a high gas pressure containing a condensed phosphate is packaged in a container having a resealable cap, the bubbling sensation and flavor brought right after opening can be maintained in the case of consuming after several days have passed, whereby the present invention has been accomplished.

More specifically, the present invention provides the following:
1) A carbonated drink packaged in a container, containing a condensed phosphate(s) in a concentration of 50 ppm or more and less than 2000 ppm, and having a gas pressure of 2.0 to 5.0 kgf/cm$^2$.
2) The carbonated drink according to item 1), wherein the a condensed phosphate(s) is sodium metaphosphate or sodium polyphosphate.
3) The carbonated drink according to item 1), comprising a high-sweetness sweetener.
4) The carbonated drink according to any one of items 1) to 3), comprising no benzoic acid or comprising 150 ppm or less of benzoic acid.
5) The carbonated drink according to any one of items 1) to 4), wherein the container has a resealable cap.
6) A bubble quality improving agent for a carbonated drink, comprising a condensed phosphate(s).
7) A drinkability maintaining agent used for a carbonated drink packaged in a container having a resealable cap, the agent comprising a condensed phosphate(s).
8) A process for producing a carbonated drink having a gas pressure of 2.0 to 5.0 kgf/cm$^2$, comprising a step of preparing a liquid in which a condensed phosphate is dissolved in a concentration of 50 ppm or more and less than 2000 ppm.

The phrase "carbonated drink" as referred to in the present invention encompasses a drink to which a sweet component, a flavor component, or the like, are added and carbon dioxide gas (carbon dioxide) is forcefully injected (in the specification, such a production process is sometimes referred to as "injecting technique"); a drink obtained by mixing a liquid pre-containing carbon dioxide gas such as carbonated water and a liquid containing a sweet component (herein, such a production process is sometimes referred to as "pre-mix method"); and a drink containing carbon dioxide gas generated in a routine manner of fermentation such as beer.

With regard to the carbonated drink packaged in a container of the present invention, the gas pressure means a gas pressure inside the container at 20° C., unless it is used in a special case. The measurement of pressure can be carried out by a standard technique well known by those in the art. The measurement may be carried out by using a prior art automatic measuring apparatus. The carbon dioxide gas content in a drink is expressed as a gas pressure (kgf/cm$^2$ or MPa) and can also be expressed as a gas volume (g/kg or w/w %) at 20° C. The gas pressure and gas volume are convertable as necessary.

The carbonated drink of the present invention is a carbonated drink having a high gas pressure. The phrase "high gas pressure" as referred to in the present invention means a gas pressure of 2.0 kg/cm$^2$ or greater, unless it is used in a special case.

The term "condensed phosphate" as referred to in the present invention is a collective term for polyphosphate, metaphosphate and ultraphosphate. The term "polyphosphate" as referred to in the present invention means the condensed phosphate having a linea chain structure and the acidic phosphate corresponding thereto. The polyphosphate encompasses pyrophosphate (sometimes referred to as diphosphate). The term "metaphosphate" as referred to in the present invention means, unless it is a special case, the condensed phosphate having a cyclic or extremely long linea chain structure and the acidic phosphate corresponding thereto. The polyphosphate having an extremely long linea chain may sometimes be referred to as metaphosphate or polymethaphosphate. The term "ultraphosphate" as referred to in the present invention means those having a structure wherein linear and cyclic chain condensed phosphates are bonded with each other.

With regard to the carbonated drink of the present invention, when a concentration of components other than carbonic acid (e.g., condensed phosphates) is shown, unless it is a special case, the content shown is a concentration of each component (weight/weight) in a solution composed of all materials excluding carbonic acid at a state to which carbon dioxide gas is not injected (before injecting) for a carbonated drink prepared by the injecting technique. When a carbonated drink as the final product is analyzed for the concentration, the concentrations of the components in a solution composed of all materials excluding carbonic acid can be determined by calculation or suitable treatment (e.g., removal of carbonic acid, etc.). For a carbonated drink prepared by the pre-mixing technique, the concentrations of the components in a solution composed of all materials excluding carbonic acid can be determined alike by calculation or suitable treatment.

The term "bubble" with regard to the carbonated drink in the present invention means, unless it is a special case, the bubble formed in a drinking liquid. Additionally, the term "foam" means, unless it is a special case, the foam formed on the drinking liquid surface and usually retained for a while when a drink is poured into a glass, or the like. The term "bubbling sensation" as referred to in the present invention means, unless it is a special case, the stimulating sensations from carbonation (cooling sensation and refreshing sensation), which can be sensed as having a favorable bubbling sensation or refreshing bubbling sensation based on the sensory evaluation in the case where a certain carbonated drink has moderate amount, fineness and retention of bubbles.

The phrase "flavor release" as referred to in the present invention means, unless it is a special case, the property for releasing the flavor inherent in a raw material. The flavor release is sometimes referred to as "flavor output". In drinks, the flavor release is poorer in many drinks containing less saccharine or sweetness than those containing more saccharine or stronger sweetness. The flavor release properties of a drink contribute to the palatability of the drink.

The term "drinkability" with regard to the drink of the present invention refers to properties of the drink, and a drink is considered to have the drinkability when it remains tasty and continuously consumable even after consumed a predetermined amount of the drink. The drinkability may also sometimes be expressed as "suitable for drinking or not". The drinkability of a carbonated drink packaged in a container and having a high gas pressure is associated with the excellence of bubbling sensation and flavor release perceived when drinking. It is preferred that the drinkability of the drink packaged in a container be maintained even when it is consumed after several hours to several days have passed since opening.

Whether or not the drinkability is maintained can suitably be determined by those skilled in the art, but, for example, a drink packaged in a resealable container can be evaluated as follows: a container-packaged carbonated drink to be tested is prepared, and the sensory evaluation is carried out for each of (1) the drink immediately after opening a container, and (2) the drink from which a portion is taken out and, if possible, recapped, and stored under realistic conditions (typically at 5° C.) for several hours to several days (typically overnight, specifically 12 to 24 hours), thereby determining the drinkability based on the comparison.

Advantageous Effects of Invention

The carbonated drink having a high gas pressure of the present invention has fine and long-lasting bubbles and can exhibit the bubbling sensation that has never been conventionally achieved. Further, the carbonated drink having a high gas pressure of the present invention has good flavor release without tasting the flavor derived from condensed phosphates and thus is a carbonated drink having high drinkability whose refreshing stimulating sensation, light flavor and pleasant cooling sensation can be fully enjoyed.

Further, the carbonated drink having a high gas pressure and packaged in a resealable container of the present invention can maintain the drinkability attained right after opening even when a gas pressure is reduced after the drink is recapped and stored for a certain period of time.

Furthermore, in the carbonated drink having a high gas pressure of the present invention, the use of a preservative, for example, benzoic acid, can be reduced or eliminated.

EMBODIMENTS OF THE INVENTION (Carbon Dioxide Gas Pressure)

The container-packaged carbonated drink of the present invention has a comparatively high gas pressure, and the gas pressure is specifically 2.0 to 5.0 kg/cm$^2$, more preferably 2.2 to 4.8 kg/cm$^2$ and further preferably 2.5 to 4.5 kg/cm$^2$.

(Condensed Phosphates)

Condensed phosphates used in the present invention are not limited insofar as condensed phosphates are acceptable as a food product, and examples include sodium pyrophosphate (also known as disodium phosphate, including both hydrates and anhydrides (e.g., sodium diphosphate decahydrate and tetrasodium pyrophosphate (anhydride))), sodium acid pyrophosphate (also known as disodium dihydrogen pyrophosphate), potassium pyrophosphate (also known as tetrapotassium pyrophosphate), sodium tripolyphosphate (also known as trisodium phosphate), sodium polyphosphate, potassium polyphosphate, sodium trimetaphosphate, sodium tetrametaphosphate, sodium pentametaphosphate, sodium hexametaphosphate (also known as (in Specifications and Standards for Food Additives, etc.) sodium metaphosphate), sodium acid metaphosphate (also known as sodium hydrogen metaphosphate, sodium acid hexametaphosphate, sodium ultraphosphate), potassium metaphosphate, and a mixture of any of these.

Condensed phosphates exhibit antibacterial activity and antiseptic activity in a drink. Further, according to the study conducted by the present inventors, condensed phosphates in a carbonated drink having a high gas pressure serve to improve properties of carbonated bubbles synergistically with carbon dioxide of a high gas pressure, more specifically, serve to make a foam fine and make bubbles last longer. Furthermore, condensed phosphates are capable of improving the flavor release and also enhancing the bubbling sensation in a carbonated drink. Still furthermore, condensed phosphates act to maintain the drinkability brought right after opening a drink having a high gas pressure even when the gas pressure is thought to have been reduced after the drink was recapped and stored for a predetermined period of time.

Among condensed phosphates, sodium metaphosphate and sodium polyphosphate are considered to have extremely strong activity to enhance the bubbling sensation in a drink having a high gas pressure, and thus it is preferred that they be used so that at least one of the condensed phosphates is sodium metaphosphate or sodium polyphosphate. Sodium metaphosphate and sodium polyphosphate may be used singly, in the form of a mixture of two of sodium metaphosphate and sodium polyphosphate, or in the form of a mixture of sodium metaphosphate and/or sodium polyphosphate and other condensed phosphates (e.g., sodium pyrophosphate).

The concentration of condensed phosphates in the present invention is, on the basis of the total weight of the drink, 50 ppm or more and less than 2000 ppm, preferably 100 ppm or more and less than 2000 ppm, more preferably 200 ppm or more and less than 1800 ppm, and further preferably 300 ppm or more and less than 1500 ppm. When a concentration of condensed phosphates is less than 50 ppm, the improvement of bubble properties in the carbonated drink having a high gas pressure, the feature of the present invention, is not achieved. Conversely, when a concentration is 2000 ppmm or more, the further improvement of bubble properties is not attained which is not only economically disadvantageous but also astringent taste and bitterness distinctive of condensed phosphates are brought out, thereby deteriorating the flavor of the drink itself.

(Sweet Component)

Sweet components to be added in the present invention include a wide variety of the conventionally known sweet components or those to be known in a future. More specifically, examples include saccharides such as sugar, grape sugar, fruit sugar, high fructose corn syrup, and like liquid sugars, starch syrup, reduced sugar syrup, honey, isomaltooligosaccharide, lactosucrose, and like oligosaccharides; sorbitol, maltitol, mannitol, erythritol, xylitol, and like sugar alcohols; α-glucosyltransferase-treated stevia, aspartame, acesulfame potassium, alitame, saccharin, saccharin sodium, cyclamate, stevia extract, stevia powder, sucralose, thaumatin (thaumatin), neotame and like sweeteners having a high degree of sweetness; which may be used singly or two or more may be used in combination. The term "high-sweetness sweetener" as referred to in the present invention means, unless it is a special case, a sweetener having more intense sweetness than sucrose and can impart sweetness when used in a small amount. The use of a high-sweetness sweetener enables providing a low calorie beverage. The phrase "a sweetener having more intense sweetness than sucrose"

means a sweetener having a higher degree of sweetness than that of sugar. More specifically, when the degree of sweetness of sugar is 1, the phrase refers to a sweetener having a degree of sweetness of more than 1, preferably 30 or more, more preferably 150 or more. Such a high-sweetness sweetener is, when more specified, a carbohydrate-free sweetener (including natural sweeteners and synthetic sweeteners).

The sweeteners having a high degree of sweetness pose problems such as having undesirable tastes, lacking in a sense of body and lingering aftertastes which have been pointed out; however, the carbonated drink of the present invention, even with the use of such a high-sweetness sweetener, due to the synergistic effect of a high gas pressure and condensed phosphates, is capable of enhancing robust taste, eliminating the undesirable tastes originated from a high-sweetness sweetener so that the inherent flavor can be enjoyed, and providing clean aftertastes and cooling feel, thereby exhibiting flavor improving effects. Consequently, the drink containing a high-sweetness sweetener is one of the preferred embodiments of the carbonated drink of the present invention.

The carbonated drink of the present invention has increased tanginess and carbonated taste due to the high gas pressure, and it is preferred to use a comparatively large amount of a sweet component from the viewpoint of preventing the carbonic stimulation from being overwhelming. In the carbonated drink having a high gas pressure, the amount of a sweet component to be added to give a pleasant stimulating sensation (refreshing sensation) of carbon dioxide gas without any overwhelming stimulating sensation from carbon dioxide gas is about 8 to about 14, preferably about 8 to about 12, and more preferably about 9 to about 11, in terms of the degree of sweetness. When the degree of sweetness exceeds 14, the taste becomes persistent and lacks in refreshing sensations, whereby the carbonated drink becomes undesirable. The degree of sweetness is the relative ratio of sweetness to the sweetness sugar being 1. The degree of sweetness of a carbonated drink can be obtained by converting the amount of each sweet component (weight concentration) contained in the carbonated drink to the corresponding amount of sugar based on a relative ratio of sweetness of the sweet component to the sweetness of sugar as 1, followed by summing up the amount of all the sweet components, being converted into the sweetness of sugar, contained in the carbonated drink (including a sweet component derived from fruit juice, and the like). The relative ratio of the sweetness of various sweet components to the sweetness of sugar as 1 can be determined using a known sugar sweetness-conversion table (for example, "Beverage Term Dictionary", Beverage Japan, Inc., published Jun. 25, 1999, Material 11).

(Flavor Component)

The flavor to be added in the present invention can be used as a mixture of one or more selected from fruit flavors and plant flavors. The fruit flavor refers to flavors derived from fruits. Examples of the fruit flavor to be used include citrus flavors such as orange flavors, lemon flavors, lime flavors and grapefruit flavors; and various fruit flavors such as apple flavors, grape flavors, raspberry flavors, cranberry flavors, cherry flavors, pineapple flavors, and the like. These fruit flavors may be those extracted from natural sources such as fruits or essential oils, or may be synthetic flavors.

The plant flavor refers to a collective term of flavors obtained from the plants other than fruits, and examples include flavors originated from seeds and nuts of plants such as kola, guarana, coffee, and the like; flavors originated from the rhizome of plants such as ginger, sassafras, Sarsaparilla, and the like; flavors originated from herbs and spices such as chamomile, elder flower, lemon balm, lavender, clove, garlic, capsicum, pepper, mustard, Japanese pepper, Japanese horseradish, laurel, clove, thyme, sage, nutmeg, mace, cardamom, caraway, anise, basil, fennel, cumin, turmeric, paprika, saffron, basil, bay leaves, marjoram, oregano, rosemary, sage, tarragon, thyme, coriander, cumin, dill, and the like. Examples of such a plant flavor include spice flavors (e.g., cola flavor, ginger ale flavor), tea flavors, and the like. These plant flavors may be those extracted from natural sources, or may be synthetic flavors.

The amount of flavors added may be suitably selected depending on the potency and the desired taste of a drink, but is typically about 0.0001 to about 5% by weight, preferably about 0.001 to about 3% by weight, based on the total weight of a carbonated drink.

Components obtained by treating, as necessary, as materials, fruit juice and fruit puree and any parts (fruit, seed and nut, leave, bark, rootstalk, petal, etc.) included in a plant body, may be added as flavor components of the present invention.

It is noted that drink containing no fruit juice or low fruit juice (a fruit juice content of less than 5% by weight, preferably less than 3% by weight, based on the total weight of a drink) packaged in a container, especially those packaged in a transparent container, suffer from significant changes in flavors owing to temperature and light. The carbonated drink of the present invention has a characteristic of inhibiting the changes in flavors even in the case of containing no fruit juice or low fruit juice by virtue of the synergistic effects of a high gas pressure and a predetermined amount of condensed phosphates and has the advantages of having little change in flavors even when consumed after several hours to several days have passed since recapped because it is packaged in a container having a resealable cap. Consequently, the drink containing no fruit juice or low fruit juice is one of the preferred embodiments of the present invention.

(Other Components)

In addition to the condensed phosphates, sweet components and flavor components described above, an acidifier is added to adjust a pH value of the drink to 2.0 to 4.5, preferably 2.5 to 4.5, more preferably 2.7 to 4.0, to savor a moderate stimulating sensation and refreshing sensation imparted by the high gas pressure and condensed phosphates in the carbonated drink of the present invention. By controlling the pH value of the carbonated drink within the above range, the stimulation from carbon dioxide gas and the sweetness of sweet components will not be too intense, thereby providing a cooling, refreshing carbonated drink well balanced between sweetness and sourness. The acidifier to be added may be any edible acidifier, and specific examples include phosphoric acid, citric acid, lactic acid, malic acid, maleic acid, adipic acid, succinic acid, fumaric acid, tartaric acid, gluconic acid, ascorbic acid, and a mixture thereof. The carbonated drink of the present invention also has a flavor-wise benefit of giving clean aftertastes. It is preferred to add a phosphate as an acidifier from the viewpoint of additively and synergistically enhancing the clean aftertastes. The amount of an acidifier may be determined so that the pH of the carbonated drink is within the above range and in consideration of the influence to the titratable acidity and tastes, but is typically about 0.01 to about 0.5% by weight, about 0.02 to about 0.3% by weight, based on the total weight of the carbonated drink.

The container-packaged carbonated drink cannot be pasteurized by heating at a high temperature after the drink is packaged in a container, for this reason preservatives are commonly used. For the carbonated drink of the present invention alike, typical preservatives for food (or drink) use can be used. Examples of the preservative include benzoate, sorbate, ascorbic acid, SHMP, EDTA, BHA, BHT, TBHQ, dehydroacetic acid, dimethyl dicarboxylate, ethoxyquin, heptyl paraben, and a mixture of one or more selected from these preservatives. These preservatives (particularly benzoate) have the astringent taste distinctive of preservatives, and can cause the refreshing sensation to deteriorate when used in carbonated drinks. As the carbonated drink of the present invention has already enhanced antibacterial properties owing to the addition of condensed phosphates, it is preferred not to add any preservative or use not more than bare minimum amount. With a smaller amount of a preservative used, the flavor characteristics of the carbonated drink of the present invention, more specifically, the improved flavor release and the enhanced clean aftertastes and refreshing sensations of the carbonated drink associated with the improvement of foam qualities due to the synergistic effects of the high gas pressure and condensed phosphates, can be remarkably exhibited. When benzoate is used as a preservative, the astringent taste and stimulation derived from benzoic acid cause the flavor of the carbonated drink to reduce, because of which the amount to be added is preferably 150 ppm or less, more preferably 100 ppm or less, 50 ppm or less, particularly preferably 0 ppm, as benzoic acid.

Further, the carbonated drink of the present invention may contain, as required, materials commonly added in beverages, for example, caffeine and like functional substances, caramel and like coloring agents or dyes, defoaming agents, thickeners, and emulsifiers. However, it is preferred that the Brix value thereof be 8 or lower in the carbonated drink of the present invention. When a Brix value exceeds 8, the mouthfeel and the sensations when swallowing become persistent, impairing the refreshing sensations and cooling sensations expected in the carbonated drink having a high gas pressure. The term Brix as referred to herein is a measurement providing a sugar content, but is a numerical value used as an index for a soluble solid content. The Brix can usually be measured using a refractometer.

(Container)

The carbonated drink of the present invention is a type of beverage which is directly consumable without dilution and is charged in a storable container (e.g., bottle, can, pack). The carbonated drink of the present invention, as described above, is capable of maintaining the flavors and foam properties attained right after opening even after several hours to several days have passed, and thus can be provided by being packaged in a container having a resealable cap. Examples of the container having a resealable cap used herein include molded containers containing as a main component polyethylene terephthalate (so called PET bottle), aluminum, steel, and like metal bottle cans.

The carbonated drink of the present invention suffers from little deterioration in flavors and color tones even when a transparent container which is notably damaged by light is used, and thus can be charged in a transparent container and made available as a cool-looking container-packaged drink.

(Production Process)

The carbonated drink having a high gas pressure of the present invention can be produced by a conventional process for producing carbonated drinks such as the injecting technique or pre-mix method, and the injecting technique is desirable due to the easiness in producing a carbonated drink having a high gas pressure. In the case of the injecting technique, a specific example include a process in which condensed phosphates, a sweet component and water are mixed to prepare a solution, further a flavor component and, as required, an acidifier, a coloring agent, a preservative, and the like, are added in sequence to prepare a mixed solution, subsequently, deaeration and sterilization treatment are carried out as necessary, and the solution is cooled to which carbon dioxide gas is injected by a routine manner to give a predetermined gas pressure, followed by charging the carbonated solution into a container.

EXAMPLES

Hereinafter, the present invention will be described with reference to Examples, but is not limited thereto. In Examples, the amount added and others are expressed on a mass basis, unless otherwise specified.

Example 1

Condensed Phosphate-Containing Cola Drink

A syrup for cola drinks was prepared with the composition shown in Table 1. Condensed phosphates were added to 50 mL of the syrup, which was charged into a 500 mL PET bottle container and diluted with 250 mL of carbonated water to produce a carbonated drink (diet cola drink) having a gas pressure of 3.0 kg/cm$^2$. The condensed phosphate (a mixture consisting of 68% of sodium metaphosphate, 30% of sodium polyphosphate and 2% of tetrasodium pyrophosphate, "Sunpolymer No. 2", manufactured by San-Ei Gen F.F.I., Inc.) was added so that the condensed phosphate concentrations in the drinks became 300, 600, 1000 and 1500 ppm (w/w). As a control, a cola drink containing no condensed phosphate was produced.

Further, cola drinks were prepared to which sodium benzoate was added so that benzoic acid as a preservative was contained to give concentrations of 55, 100 and 150 ppm (w/w).

These cola drinks were evaluated for the desiredness in flavor, in comparison with the control. Table 2 shows the results. The drinks containing the condensed phosphate did not give disagreeable tastes to the cola drinks, enhanced the flavor release, and imparted refreshing bubbling sensation, thereby resulting in highly palatable cola drinks (sample Nos. 1 to 4). However, while the cola drinks containing the preservative (benzoic acid) can provide refreshing bubbling sensation, the distinctive astringent taste developed depending on the amount added and the flavor of the drinks (cola flavor) was lost (sample Nos. 5 to 8). The drink containing benzoic acid in a concentration of 200 ppm failed to give refreshing bubbling sensation by the condensed phosphate due to the astringent taste and stimulation of the acid. From these results, it is suggested that the preservative (benzoic acid) is preferably not used (0 ppm) but, when added, it is 150 ppm or less, preferably 100 ppm or less, more preferably 55 ppm or less.

TABLE 1

|  | Amount added (g) |
|---|---|
| 80% Phosphoric acid | 14.58 |
| Citric acid | 2.93 |
| Aspartame | 1.80 |
| Acesulfame K | 0.57 |
| Cola flavor | 21.90 |
| Water | Proper amount |
| Total amount | 1000 mL |

TABLE 2

|  | Control 1 | No. 1 | No. 2 | No. 3 | No. 4 | No. 5 | No. 6 | No. 7 | No. 8 | No. 9 |
|---|---|---|---|---|---|---|---|---|---|---|
| Condensed phosphate concentration ppm (w/w) | 0 | 300 | 600 | 1000 | 1500 | 300 | 600 | 300 | 300 | 300 |
| Benzoic acid concentration ppm (w/w) | 0 | 0 | 0 | 0 | 0 | 55 | 55 | 100 | 150 | 200 |
| Sensory evaluation |  |  |  |  |  |  |  |  |  |  |
| (Bubbling sensation) |  | ++ | ++ | ++ | ++ | ++ | ++ | ++ | ++ | ± |
| (Cola flavor intensity) |  | ++ | ++ | ++ | ++ | − | − | −− | −− | −− |
| (Disagreeable taste) |  | −− | −− | −− | − | −− | −− | + | + | ++ |
| (Overall desiredness) |  | ◎ | ◎ | ◎ | ◎ | ○ | ○ | Δ | Δ | x |
| Comment |  | Almost no difference in flavors is noted but slightly better flavor release is noted, compared with the control. A refreshing bubbling sensation is noted. |  |  | A refreshing bubbling sensation is imparted compared with the control, but the cola flavor seems slightly lost. |  | A refreshing bubbling sensation is imparted compared with the control, but the astringent taste distinctive of benzoic acid is noted and the cola flavor is lost |  | The astringent taste distinctive of benzoic acid is overwhelming, distinctive stimulation is noted in the aftertastes, a refreshing sensation is missing. |  |

(Evaluation)
Bubbling sensation
++: Clearly stronger than the control,
+: Slightly stronger than the control,
±: Approximately equal to the control,
−: Slightly weaker than the control,
−−: Weaker than the control
Flavor intensity
++: Clearly stronger than the control,
+: Slightly stronger than the control,
±: Approximately equal to the control,
−: Slightly weaker than the control,
−−: Weaker than the control
Disagreeable taste
++: Noted taste different from that of the control,
+: Noted slightly taste different from that of the control,
−: Noted no taste different from that of the control
Overall desiredness
◎: Extremely desirable (compared with the control),
○: Desirable,
Δ: Fair (approximately equal to the control),
x: Not desirable Further, two of each of control 1 and sample No. 1 cola drinks were used to carry out the storage test. After allowing the cola drinks to stand at 28° C. for 14 hours, one of each of control 1 and sample No. 1 was opened from which 50 ml was taken out, and recapped. The drinks were allowed to stand at 5° C. for 13 days, reopened to take out 50 ml and recapped, followed by standing at 5° C. for 16 hours. The other drink which had remained closed was further allowed to stand for 14 days, followed by standing at 5° C. for 16 hours. The cola drinks after stored were subjected to the sensory evaluation for the stimulation (bubbling sensation) from carbon dioxide evaluated by experienced panelists.

Table 3 shows the results. Owing to the addition of the condensed phosphate, the refreshing bubbling sensation, which is the characteristic of the carbonated drink, was retained even after the drink was recapped and stored.

TABLE 3

|  | Control 1 | No. 1 |
|---|---|---|
| Condensed phosphate concentration ppm (w/w) | 0 | 300 |
| Opened or closed* | Closed    Recapped | Closed    Recapped |
| Sensory evaluation (comment) | Compared with the drink remaining closed and stored, the bubbling sensation is significantly lost. No refreshing bubbling sensation is noted. | Even in the opened sample, the refreshing bubbling sensation is retained. |

*Opened or closed:
"Closed" is a drink remaining closed
"Recapped" is a drink opened twice, and recapped.

Example 2

Condensed Phosphate-Containing Cider Drink (1)

Commercial cider drinks packaged in a 500 mL PET bottle (raw materials: sugars (high fructose corn syrup, sugar), flavors, acidifier) were purchased and 1 g of a condense phosphate solution (a solution in which ion exchanged water was added to condensed phosphoric acid and dissolved) was added to the cider drinks so that condensed phosphate had final concentrations of 50, 100, 300, 600, 1000, 1500, 1800 and 2000 ppm (w/w), the gas pressure was adjusted and the bottles were closed to prepare PET bottle-packaged cider drinks having a gas pressure of 3.0 kg/cm². The condensed phosphate used was the same as in Example 1. Further, PET bottle-packaged cider drinks to which 1 g of ion exchanged water was added and having a gas pressure of 3.0 kg/cm² were prepared as a control. These cider drinks were each prepared in twos.

After allowing these cider drinks to stand at 28° C. for 22 hours, one was opened from which 50 ml was taken out and recapped. This cider drink and the other bottle which remained closed were together allowed to stand at 5° C. for 16 hours, and subjected to the sensory evaluation for flavors for the stimulation (bubbling sensation) from carbon dioxide evaluated by experienced panelists. The evaluation was carried out on the basis of the 5-point system, taking 3 points for the control that remained closed (control 2), for whether or not the flavor and the bubbling sensations were noted stronger than the control (5 points: extremely strong in comparison with control 2, very desirable bubbling sensation, 4 points: strong in comparison with control 1, favorable bubbling sensation, 3 points: equal to control 2, 2 points: weak in comparison with control 2, not desirable bubbling sensation, 1 point: very weak in comparison with control 2, extremely undesirable bubbling sensation).

Table 4 shows the results (the sensory evaluation point refers to the average point given by the panelists). As evident from Table 3, the addition of the condensed phosphate to the cider drinks enhanced the bubbling sensation compared with control 2, particularly when 100 ppm or more of the condensed phosphate was added, refreshing and desirable bubbles were formed. In addition, the drinks to which the condensed phosphate was added had good flavor release, thereby being highly palatable drinks compared with control 2. However, when 2000 ppm of the condensed phosphate was added, the flavor distinctive of the condensed phosphate was slightly noted and the refreshing sensation in the aftertaste was lost. Thus, it is suggested that the upper limit of the condensed phosphate is less than 2000 ppm, preferably about 1800 ppm.

Further, the once-opened drink seemed to have lost the bubbling sensation and had overwhelming sweetness, thereby being a drink that lacks palatability (control 3), whereas the drinks containing the condensed phosphate, those containing particularly 50 ppm or more, particularly 100 ppm or more of the condensed phosphate, are being the drinks having retained bubbling sensation which is pleasant to the tongue and had never lost the flavor balance even when once opened, thereby having high drinkability carbonated drinks (sample Nos. 11, 13, 15, 17, 19, 21 and 23).

TABLE 4

|  | Control 2 | Control 3 | No. 10 | No. 11 | No. 12 | No. 13 |
|---|---|---|---|---|---|---|
| Condensed phosphate concentration ppm (w/w) | 0 | | 50 | | 100 | |
| Opened or closed* | Closed | Recapped | Closed | Recapped | Closed | Recapped |
| Sensory evaluation (bubbling sensation) | 3.00 | 2.25 | 3.15 | 2.40 | 3.25 | 2.75 |
| Difference (closed − recapped) | | 0.75 | | 0.75 | | 0.5 |
| Sensory evaluation (Flavor release) | 3.00 | 2.10 | — | — | — | — |
| Comment | | Significantly lost bubbling sensation. Overwhelming sweetness noted. | Slightly enhanced bubbling sensation | The bubbling sensation is lost after recapped, but a more bubbling sensation is noted than in control 3 | Enhanced bubbling sensation. Refreshing bubbling sensation. | A bubbling sensation is noted even after recapped. Pleasant to the tongue. |

|  | No. 14 | No. 15 | No. 16 | No. 17 | No. 18 | No. 19 |
|---|---|---|---|---|---|---|
| Condensed phosphate concentration ppm (w/w) | 300 | | 600 | | 1000 | |
| Opened or closed* | Closed | Recapped | Closed | Recapped | Closed | Recapped |
| Sensory evaluation (bubbling sensation) | 3.40 | 2.95 | 3.45 | 3.10 | 3.55 | 3.20 |
| Difference (closed − recapped) | | 0.45 | | 0.35 | | 0.35 |
| Sensory evaluation (Flavor release) | 3.30 | 2.60 | — | — | — | — |
| Comment | Enhanced bubbling sensation. Refreshing bubbling sensation. | A bubbling sensation is noted even after recapped. Pleasant to the tongue. | Enhanced bubbling sensation. Refreshing bubbling sensation. | A bubbling sensation is noted even after recapped. Pleasant to the tongue. | Enhanced bubbling sensation. Refreshing bubbling sensation. | A bubbling sensation is noted even after recapped. Pleasant to the tongue. |

|  | No. 20 | No. 21 | No. 22 | No. 23 | No. 24 |
|---|---|---|---|---|---|
| Condensed phosphate concentration ppm (w/w) | 1500 | | 1800 | | 2000 |
| Opened or closed* | Closed | Recapped | Closed | Recapped | Recapped |
| Sensory evaluation (bubbling sensation) | 3.65 | 3.30 | 3.75 | 3.30 | 3.75 |
| Difference (closed − recapped) | | 0.35 | | 0.45 | — |

TABLE 4-continued

| Sensory evaluation (Flavor release) | — | — | — | — | — | — |
|---|---|---|---|---|---|---|
| Comment | | Enhanced bubbling sensation. Refreshing bubbling sensation. | A bubbling sensation is noted even after recapped. Pleasant to the tongue. | Enhanced bubbling sensation. Refreshing bubbling sensation. | A bubbling sensation is noted even after recapped. Pleasant to the tongue. | An enhanced bubbling sensation, but the unpleasant taste distinctive of polyphosphate are noted in the aftertastes, and a refreshing sensation is somewhat missing. |

*Opened or closed: "Closed" indicates those remaining closed, "Recapped" indicates those opened once and recapped.

Example 3

Condensed Phosphate-Containing Cider Drink (2)

Commercial cider drinks packaged in a 500 mL PET bottle (materials: sugars (high fructose corn syrup, sugar), flavors, acidifier) were purchased and 2 g of a condense phosphate solution (a solution in which ion exchanged water was added to the condensed phosphate and dissolved) was added to the cider drinks so that the condensed phosphate had final concentrations of 50, 100, 200, 300, 400 and 500 ppm (w/w), the gas pressure was adjusted and the bottles were closed to prepare PET bottle-packaged cider drinks having a gas pressure of 3.0 kg/cm2. The condensed phosphates used were sodium pyrophosphate, sodium polyphosphate, sodium metaphosphate (all manufactured by Taihei Chemical Industrial Co., Ltd.), and the same condensed phosphate used in Example 1 (a mixture consisting of 68% of sodium metaphosphate, 30% of sodium polyphosphate and 2% of tetrasodium pyrophosphate, "Sunpolymer No. 2", manufactured by San-Ei Gen F.F.I., Inc.). Further, PET bottle-packaged cider drinks to which 2 g of ion exchanged water was added and having a gas pressure of 3.0 kg/cm2 were prepared as a control. These cider drinks were each prepared in twos.

After allowing these cider drinks to stand at 28° C. for 22 hours, one was opened from which 50 ml was taken out and recapped. This cider drink and the other bottle which remained closed were together allowed to stand at 5° C. for 16 hours, and subjected to the sensory evaluation for flavors for the stimulation (bubbling sensation) from carbon dioxide evaluated by experienced panelists. The evaluation was carried out on the basis of the 5-point system, taking 3 points for the control that remained closed (control 2), for whether or not the flavor and the bubbling sensations were noted stronger than the control (5 points: extremely strong in comparison with control 2, very desirable bubbling sensation, 4 points: strong in comparison with control 1, favorable bubbling sensation, 3 points: equal to control 2, 2 points: weak in comparison with control 2, not desirable bubbling sensation, 1 point: very weak in comparison with control 2, extremely undesirable bubbling sensation).

Table 5 shows the results of the case where sodium pyrophosphate was used as the condensed phosphate, Table 6 shows the results of the case where sodium polyphosphate was used, Table 7 shows the results of the case where sodium metaphosphate was used, and Table 8 shows the results of the case where the mixture containing sodium polyphosphate and sodium metaphosphate (Sunpolymer No. 2) was used (the sensory evaluation point refers to the average point given by the panelists. The average point was rounded off to the first decimal.). As evident from Tables 5 to 8, the addition of the condensed phosphate to the cider drinks enhanced the bubbling sensation compared with control 2, thereby forming refreshing and desirable bubbles. In addition, the drinks to which the condensed phosphate was added had good flavor release, thereby being highly palatable drinks compared with control 2.

Further, the once-opened drink seemed to have lost the bubbling sensation and had overwhelming sweetness, thereby being a drink that lacks palatability (control 3), whereas the drinks containing the condensed phosphate are being the drinks having retained bubbling sensation which is pleasant to the tongue, had never lost the flavor balance even when once opened, thereby having high drinkability carbonated drinks (sample Nos. 26, 28, 30, 32, 34, 36, 38, 40, 42, 44, 46, 48, 50, 52, 54, 56, 58, 60, 64, 66, 68, 70 and 72). Among the condensed phosphates, it is suggested that sodium polyphosphate, sodium metaphosphate and the mixtures containing these sodium phosphates have great improvement effects in the bubbling sensation.

TABLE 5

| | | Control 1 | Control 2 | No. 25 | No. 26 | No. 27 | No. 28 | No. 29 | No. 30 |
|---|---|---|---|---|---|---|---|---|---|
| Polyphosphate concentration ppm (w/w) | Sodium pyrophosphate Na | 0 | | 50 | | 100 | | 200 | |
| | Sodium polyphosphate Na | 0 | | 0 | | 0 | | 0 | |
| | Sodium metaphosphate Na | 0 | | 0 | | 0 | | 0 | |
| | Sunpolymer No. 2 | 0 | | 0 | | 0 | | 0 | |
| Closed or opened | | Closed | Recapped | Closed | Recapped | Closed | Recapped | Closed | Recapped |
| Sensory evaluation (bubbling sensation) | | 3.0 | 2.4 | 3.0 | 2.5 | 3.2 | 2.9 | 3.4 | 3.1 |
| Difference (Closed − recapped) | | | 0.6 | | 0.5 | | 0.3 | | 0.3 |
| Sensory evaluation (flavor release) | | 3.0 | 2.7 | — | — | — | — | — | — |

TABLE 5-continued

| Comment | The bubbling sensation is significantly lost. An overwhelming sweetness is noted. | The bubbling sensation is lost after recapped, but a more bubbling sensation is noted than in control 2 | Enhanced bubbling sensation. A refreshing bubbling sensation is noted. | A bubbling sensation is noted even after recapped. | Enhanced bubbling sensation. A refreshing bubbling sensation is noted. | A bubbling sensation is noted even after recapped. |
|---|---|---|---|---|---|---|

|  |  | No. 31 | No. 32 | No. 33 | No. 34 | No. 35 | No. 36 |
|---|---|---|---|---|---|---|---|
| Polyphosphate concentration ppm (w/w) | Sodium pyrophosphate Na | 300 |  | 400 |  | 500 |  |
|  | Sodium polyphosphate Na | 0 | 0 | 0 | 0 | 0 | 0 |
|  | Sodium metaphosphate Na | 0 | 0 | 0 | 0 | 0 | 0 |
|  | Sunpolymer No. 2 | 0 | 0 | 0 | 0 | 0 | 0 |
| Closed or opened |  | Closed | Recapped | Closed | Recapped | Closed | Recapped |
| Sensory evaluation (bubbling sensation) |  | 3.5 | 3.3 | 3.7 | 3.4 | 3.7 | 3.5 |
| Difference (Closed − recapped) |  |  | 0.2 |  | 0.3 |  | 0.2 |
| Sensory evaluation (flavor release) |  | 3.2 | 3.1 | — | — | — | — |
| Comment |  | Enhanced bubbling sensation. A refreshing bubbling sensation is noted. | A bubbling sensation is noted even after recapped. | Enhanced bubbling sensation. A refreshing bubbling sensation is noted. | A bubbling sensation is noted even after recapped. | Enhanced bubbling sensation. A refreshing bubbling sensation is noted. | A bubbling sensation is noted even after recapped. |

TABLE 6

|  |  | Control 1 | Control 2 | No. 37 | No. 38 | No. 39 | No. 40 | No. 41 | No. 42 |
|---|---|---|---|---|---|---|---|---|---|
| Polyphosphate concentration ppm (w/w) | Sodium pyrophosphate Na | 0 |  | 0 |  | 0 |  | 0 |  |
|  | Sodium polyphosphate Na | 0 |  | 50 |  | 100 |  | 200 |  |
|  | Sodium metaphosphate Na | 0 |  | 0 |  | 0 |  | 0 |  |
|  | Sunpolymer No. 2 | 0 |  | 0 |  | 0 |  | 0 |  |
| Closed or opened |  | Closed | Recapped | Closed | Recapped | Closed | Recapped | Closed | Recapped |
| Sensory evaluation (bubbling sensation) |  | 3.0 | 2.4 | 3.1 | 2.9 | 3.3 | 3.2 | 3.5 | 3.2 |
| Difference (Closed − recapped) |  |  | 0.6 |  | 0.2 |  | 0.1 |  | 0.3 |
| Sensory evaluation (flavor release) |  | 3.0 | 2.7 | — | — | — | — | — | — |
| Comment |  |  | The bubbling sensation is significantly lost. An overwhelming sweetness is noted. | Enhanced bubbling sensation | A bubbling sensation is noted even after recapped. | Enhanced bubbling sensation. Smooth bubbling sensation. | A bubbling sensation is noted even after recapped. Smooth bubbling sensation. | Enhanced bubbling sensation. Also pleasant to the tongue. | A bubbling sensation is noted even after recapped. Also pleasant to the tongue. |

|  |  | No. 43 | No. 44 | No. 45 | No. 46 | No. 47 | No. 48 |
|---|---|---|---|---|---|---|---|
| Polyphosphate concentration ppm (w/w) | Sodium pyrophosphate Na | 0 |  | 0 |  | 0 |  |
|  | Sodium polyphosphate Na | 300 |  | 400 |  | 500 |  |

TABLE 6-continued

|  |  |  |  |  |  |  |
|---|---|---|---|---|---|---|
| Sodium metaphosphate Na | 0 | | 0 | | 0 | |
| Sunpolymer No. 2 | 0 | | 0 | | 0 | |
| Closed or opened | Closed | Recapped | Closed | Recapped | Closed | Recapped |
| Sensory evaluation (bubbling sensation) | 3.6 | 3.5 | 3.7 | 3.6 | 3.8 | 3.7 |
| Difference (Closed − recapped) | | 0.1 | | 0.1 | | 0.1 |
| Sensory evaluation (flavor release) | 3.2 | 3.1 | — | — | — | — |
| Comment | Enhanced bubbling sensation. Smooth bubbling sensation. | A bubbling sensation is noted even after recapped. Pleasant to the tongue. | Enhanced bubbling sensation. Fine bubbling sensation. | A bubbling sensation is noted even after recapped. Pleasant to the tongue. | Enhanced bubbling sensation. Fine bubbling sensation. | A bubbling sensation is noted even after recapped. Pleasant to the tongue. |

TABLE 7

|  |  | Control 1 | Control 2 | No. 49 | No. 50 | No. 51 | No. 52 | No. 53 | No. 54 |
|---|---|---|---|---|---|---|---|---|---|
| Polyphosphate concentration ppm (w/w) | Sodium pyrophosphate Na | 0 | | 0 | | 0 | | 0 | |
| | Sodium polyphosphate Na | 0 | | 0 | | 0 | | 0 | |
| | Sodium metaphosphate Na | 0 | | 50 | | 100 | | 200 | |
| | Sunpolymer No. 2 | 0 | | 0 | | 0 | | 0 | |
| Closed or opened | | Closed | Recapped | Closed | Recapped | Closed | Recapped | Closed | Recapped |
| Sensory evaluation (bubbling sensation) | | 3.0 | 2.4 | 3.4 | 3.2 | 3.6 | 3.4 | 3.8 | 3.6 |
| Difference (Closed − recapped) | | | 0.6 | | 0.2 | | 0.2 | | 0.2 |
| Sensory evaluation (flavor release) | | 3.0 | 2.7 | — | — | — | — | — | — |
| Comment | | | The bubbling sensation is significantly lost. An overwhelming sweetness is noted. | Enhanced bubbling sensation. A refreshing bubbling sensation is noted. Robust bubbling sensation. | A bubbling sensation is noted even after recapped. Also pleasant to the tongue. | Enhanced bubbling sensation. A refreshing bubbling sensation is noted. Robust bubbling sensation | A bubbling sensation is noted even after recapped. Also pleasant to the tongue. | Enhanced bubbling sensation. A refreshing bubbling sensation is noted. Robust bubbling sensation. | A bubbling sensation is noted even after recapped. Also pleasant to the tongue. |

|  |  | No. 55 | No. 56 | No. 57 | No. 58 | No. 59 | No. 60 |
|---|---|---|---|---|---|---|---|
| Polyphosphate concentration ppm (w/w) | Sodium pyrophosphate Na | 0 | | 0 | | 0 | |
| | Sodium polyphosphate Na | 0 | | 0 | | 0 | |
| | Sodium metaphosphate Na | 300 | | 400 | | 500 | |
| | Sunpolymer No. 2 | 0 | | 0 | | 0 | |
| Closed or opened | | Closed | Recapped | Closed | Recapped | Closed | Recapped |
| Sensory evaluation (bubbling sensation) | | 3.9 | 3.8 | 4.0 | 3.9 | 4.6 | 4.6 |
| Difference (Closed − recapped) | | | 0.1 | | 0.1 | | 0 |
| Sensory evaluation (flavor release) | | 3.2 | 3.1 | — | — | — | — |
| Comment | | Enhanced bubbling sensation. A refreshing | A bubbling sensation is noted even after | Enhanced bubbling sensation. A refreshing | A bubbling sensation is noted even after | Enhanced bubbling sensation. A refreshing | A bubbling sensation is noted after |

TABLE 7-continued

|  |  | bubbling sensation is noted. Robust bubbling sensation. | recapped. Also pleasant to the tongue. | bubbling sensation is noted. Robust bubbling sensation. | recapped. Also pleasant to the tongue. | bubbling sensation is noted. Robust bubbling sensation. | recapped. Also pleasant to the tongue. |
|---|---|---|---|---|---|---|---|
|  |  | Control 1 | Control 2 | No. 61 | No. 62 | No. 63 | No. 64 | No. 65 | No. 66 |
| Polyphosphate concentration ppm (w/w) | Sodium pyrophosphate Na | 0 |  | 0 |  | 0 |  | 0 |  |
|  | Sodium polyphosphate Na | 0 |  | 0 |  | 0 |  | 0 |  |
|  | Sodium metaphosphate Na | 0 |  | 0 |  | 0 |  | 0 |  |
|  | Sunpolymer No. 2 | 0 |  | 50 |  | 100 |  | 200 |  |
| Closed or opened |  | Closed | Recapped | Closed | Recapped | Closed | Recapped | Closed | Recapped |
| Sensory evaluation (bubbling sensation) |  | 3.0 | 2.4 | 3.1 | 2.6 | 3.3 | 3.1 | 3.5 | 3.3 |
| Difference (Closed − recapped) |  |  | 0.6 |  | 0.5 |  | 0.2 |  | 0.2 |
| Sensory evaluation (flavor release) |  | 3.0 | 2.7 | — | — | — | — | — | — |
| Comment |  |  | The bubbling sensation is significantly lost. An overwhelming sweetness is noted. | Slightly enhanced bubbling sensation. | Bubbling sensation lost after recapped, but noted more bubbling sensation than control 2 | Enhanced bubbling sensation. Smooth bubbling sensation. | Retained bubbling sensation after recapped noted. Also pleasant to the tongue. | Enhanced bubbling sensation. Smooth bubbling sensation. | Retained bubbling sensation after recapped noted. Also pleasant to the tongue. |

|  |  | No. 67 | No. 68 | No. 69 | No. 70 | No. 71 | No. 72 |
|---|---|---|---|---|---|---|---|
| Polyphosphate concentration ppm (w/w) | Sodium pyrophosphate Na | 0 |  | 0 |  | 0 |  |
|  | Sodium polyphosphate Na | 0 |  | 0 |  | 0 |  |
|  | Sodium metaphosphate Na | 0 |  | 0 |  | 0 |  |
|  | Sunpolymer No. 2 | 300 |  | 400 |  | 500 |  |
| Closed or opened |  | Closed | Recapped | Closed | Recapped | Closed | Recapped |
| Sensory evaluation (bubbling sensation) |  | 3.6 | 3.5 | 3.7 | 3.6 | 3.9 | 3.7 |
| Difference (Closed − recapped) |  |  | 0.1 |  | 0.1 |  | 0.2 |
| Sensory evaluation (flavor release) |  | 3.2 | 3.1 | — | — | — | — |
| Comment |  | Enhanced bubbling sensation. Smooth bubbling sensation. | Retained bubbling sensation after recapped noted. Also pleasant to the tongue. | Enhanced bubbling sensation. Fine bubbling sensation. | Retained bubbling sensation after recapped noted. Also pleasant to the tongue. | Enhanced bubbling sensation. Fine bubbling sensation. | Retained bubbling sensation after recapped noted. Also pleasant to the tongue. |

TABLE 8

|  |  | Control 1 | Control 2 | No. 61 | No. 62 | No. 63 | No. 64 | No. 65 | No. 66 |
|---|---|---|---|---|---|---|---|---|---|
| Polyphosphate concentration | Sodium pyrophosphate Na | 0 |  | 0 |  | 0 |  | 0 |  |

TABLE 8-continued

| tration ppm (w/w) | Sodium polyphosphate Na | 0 | | 0 | | 0 | | 0 | |
|---|---|---|---|---|---|---|---|---|---|
| | Sodium metaphosphate Na | 0 | | 0 | | 0 | | 0 | |
| | Sunpolymer No. 2 | 0 | | 50 | | 100 | | 200 | |
| Closed or opened | | Closed | Recapped | Closed | Recapped | Closed | Recapped | Closed | Recapped |
| Sensory evaluation (bubbling sensation) | | 3.0 | 2.4 | 3.1 | 2.6 | 3.3 | 3.1 | 3.5 | 3.3 |
| Difference (Closed − recapped) | | | 0.6 | | 0.5 | | 0.2 | | 0.2 |
| Sensory evaluation (flavor release) | | 3.0 | 2.7 | — | — | — | — | — | — |
| Comment | | | The bubbling sensation is significantly lost. An overwhelming sweetness is noted. | Slightly enhanced bubbling sensation. | Bubbling sensation lost after recapped, but noted more bubbling sensation than control 2 | Enhanced bubbling sensation. Smooth bubbling sensation. | Retained bubbling sensation after recapped noted. Also pleasant to the tongue. | Enhanced bubbling sensation. Smooth bubbling sensation. | Retained bubbling sensation after recapped noted. Also pleasant to the tongue. |

| | | No. 67 | No. 68 | No. 69 | No. 70 | No. 71 | No. 72 |
|---|---|---|---|---|---|---|---|
| Polyphosphate concentration ppm (w/w) | Sodium pyrophosphate Na | 0 | | 0 | | 0 | |
| | Sodium polyphosphate Na | 0 | | 0 | | 0 | |
| | Sodium metaphosphate Na | 0 | | 0 | | 0 | |
| | Sunpolymer No. 2 | 300 | | 400 | | 500 | |
| Closed or opened | | Closed | Recapped | Closed | Recapped | Closed | Recapped |
| Sensory evaluation (bubbling sensation) | | 3.6 | 3.5 | 3.7 | 3.6 | 3.9 | 3.7 |
| Difference (Closed − recapped) | | | 0.1 | | 0.1 | | 0.2 |
| Sensory evaluation (flavor release) | | 3.2 | 3.1 | — | — | — | — |
| Comment | | Enhanced bubbling sensation. Smooth bubbling sensation. | Retained bubbling sensation after recapped noted. Also pleasant to the tongue. | Enhanced bubbling sensation. Fine bubbling sensation. | Retained bubbling sensation after recapped noted. Also pleasant to the tongue. | Enhanced bubbling sensation. Fine bubbling sensation. | Retained bubbling sensation after recapped noted. Also pleasant to the tongue. |

Example 4

Container-Packaged Condensed Phosphate-Containing Ice Cream Soda-Type Drink

According to the following composition, an ice cream soda-type drink was produced by dissolving the materials in pure water as necessary and injecting carbon dioxide gas to give a gas pressure of 2.20 kg/cm².

| Materials | Amount added in 100 g |
|---|---|
| High fructose corn syrup | 13 g |
| Sucrose liquid sugar | 1.8 g |
| Sodium benzoate | 0.018 g |
| Citric acid (anhydride) | 0.11 g |
| Trisodium citrate | 0.015 g |
| Condensed phosphate (same as in Example 1) | 0.03 g |
| Flavor | proper amount |
| Coloring agent | proper amount |

The invention claimed is:

1. A carbonated drink charged in a container having a resealable cap, comprising
   sodium metaphosphate and/or sodium polyphosphate in a concentration of 200 ppm or more and less than 2000 ppm, and
   having a gas pressure of 2.2 to 4.8 kg/cm².

2. The carbonated drink according to claim 1, further comprising a high-sweetness sweetener.

3. The carbonated drink according to claim 1, comprising no benzoic acid or comprising 150 ppm or less of benzoic acid.

4. The carbonated drink according to claim 1, wherein the concentration is 200 ppm or more and less than 1800 ppm.

5. The carbonated drink according to claim 1, wherein the concentration is 300 ppm or more and less than 1500 ppm.

6. The carbonated drink according to claim 1, wherein the gas pressure of 2.5 to 4.5 kg/cm$^2$.

7. A method of producing a carbonated drink having a gas pressure of 2.0 to 5.0 kg/cm$^2$, comprising steps of
   preparing a liquid in which sodium metaphosphate and/or sodium polyphosphate is dissolved in a concentration of 100 ppm or more and less than 2000 ppm; and
   charging the prepared liquid into a container having a resealable cap.

\* \* \* \* \*